US008078078B2

(12) United States Patent
Matsumoto (10) Patent No.: US 8,078,078 B2
(45) Date of Patent: Dec. 13, 2011

(54) IMAGE FORMING APPARATUS, IMAGE FORMING METHOD AND RECORDING MEDIUM

(75) Inventor: Manabu Matsumoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 434 days.

(21) Appl. No.: 12/335,994

(22) Filed: Dec. 16, 2008

(65) Prior Publication Data

US 2009/0190143 A1 Jul. 30, 2009

(30) Foreign Application Priority Data

Jan. 25, 2008 (JP) ................. 2008-015431

(51) Int. Cl.
*G03G 15/00* (2006.01)

(52) U.S. Cl. .............. 399/82; 399/84; 399/382

(58) Field of Classification Search .......... 399/16, 399/17, 45, 82, 84, 382
See application file for complete search history.

(56) References Cited

U.S. PATENT DOCUMENTS

| 7,268,909 | B2 | 9/2007 | Nakagiri | |
|---|---|---|---|---|
| 7,812,996 | B2 * | 10/2010 | Sakamoto | 358/1.18 |
| 2005/0134871 | A1 | 6/2005 | Nakagiri | 358/1.6 |
| 2006/0001896 | A1 | 1/2006 | Sakamoto | 358/1.13 |

FOREIGN PATENT DOCUMENTS

| CN | 1613656 A | 5/2005 |
|---|---|---|
| JP | 09-252386 | 9/1997 |
| JP | 09-261383 | 10/1997 |
| JP | 10-161828 | 6/1998 |
| JP | 10-243130 | 9/1998 |
| JP | 2005-033368 | 2/2005 |
| JP | 2005-142770 | 6/2005 |
| JP | 2006-018748 | 1/2006 |
| JP | 2006-259187 | 8/2006 |

* cited by examiner

*Primary Examiner* — Hoang Ngo (74) *Attorney, Agent, or Firm* — Renner, Otto, Boisselle & Sklar, LLP (57) ABSTRACT

Based on whether image formation is to be performed on an one side or both sides of record paper, and on whether image data concerning image formation is image data of an one-sided document or image data of a double-sided document, it is judged whether a blank page or a blank sheet whose both sides are blank pages is included, and image formation is performed excluding said blank page or both sides of the blank sheet based on said judgment result.

10 Claims, 10 Drawing Sheets

IMAGE FORMING APPARATUS, IMAGE FORMING METHOD AND RECORDING MEDIUM

CROSS-REFERENCE TO RELATED APPLICATIONS

This Nonprovisional application claims priority under 35 U.S.C. §119(a) on Patent Application No. 2008-015431 filed in Japan on Jan. 25, 2008, and the entire contents of which are hereby incorporated by reference.

BACKGROUND

1. Technical Field

The present invention relates to an image forming apparatus which performs image formation on an one side or both sides of a record sheet based on image data of an one-sided document or a double-sided document, and a recording medium storing a computer program.

2. Description of Related Art

In the conventional image forming apparatuses such as a copying machine, a facsimile machine and a composite machine, in a case of a so-called copy processing in which image data of a document is automatically read and image formation based on said image data is performed on an one side or both sides of a record sheet, the following problems arise. For example, when one sheet of an unnecessary blank page is included in a document to be read in which no object such as a character and a figure is recorded, since image data of the sheet of said blank page is read as it is and an image is formed on a record sheet, there is a problem that an unnecessary blank page is included even after the copy processing, and output efficiency decreases.

As to the above-mentioned problem, when an one-sided document which contains an object in an one side and a double-sided document which contains objects in both sides are intermingled, a case where a blank paper is included in a document to be read by an operator's error, or the like is considered as a cause. Japanese Patent Application Laid-Open No. 10-243130 (1998) discloses an image processing device which removes, when reading image data of documents in which said one-sided document and double-sided document are intermingled, image data concerning a blank page from image data of a document, accumulates image data of other pages in memory sequentially, edits the accumulated image data, and performs image formation on both sides of a record sheet.

SUMMARY

On the other hand, all the blank pages included in an object document are not necessarily caused by an error. For example, in order to call readers' attention at the time of changing a chapter when a document to be read is a double-sided document in which objects are contained on both sides of each sheet, or in order to recover readers' concentration in a case of a document consisting of a large number of sheets, a maker of the document may insert the blank page intentionally. In such a case, it is not desirable to remove the blank page inserted intentionally. The intentional insertion of such a blank page should be taken into consideration especially when forming images based on image data of a double-sided document on both sides of a record sheet. On the other hand, it is not necessary to be considered, when a document to be read is an one-sided document in which an object is contained in an one side of a sheet, or when an image is to be formed on an one side of a record sheet, or the like. In other words, removal of a blank page should be carried out in consideration of whether image formation is to be performed on an one side of a record sheet or on both sides of the record sheet, and in consideration of whether a document is an one-sided document or a double-sided document.

However, the image processing device of Japanese Patent Application Laid-Open No. 10-243130 (1998) is disclosed for a use limited to a case of performing image formation on both sides of a record sheet. According to said processing of the image processing device of Japanese Patent Application Laid-Open No. 10-243130 (1998), even a blank page which the maker of the document inserted intentionally from necessity will be discarded, and the maker's intention cannot be reflected. In the image processing device of Japanese Patent Application Laid-Open No. 10-243130 (1998), a problem arises that it is impossible to keep consistency of pages between a document before the processing and a resultant document obtained after the processing. That is, when said processing by the image processing device of Japanese Patent Application Laid-Open No. 10-243130 (1998) is performed and an odd number of blank pages are discarded, change of page numbers caused by said discard occurs, and a front page and a back page interchange, and thereby, there is a possibility of giving readers sense of incongruity.

In view of this situation, it is an object to provide an image forming apparatus and a recording medium storing a computer program, which can remove only an unnecessary blank page precisely and effectively prevent lowering of efficiency due to image formation of an unnecessary blank page, by judging whether a blank page or a blank sheet whose both sides are blank pages is included, based on whether image formation is to be performed on an one side or both sides of record paper, and on whether image data concerning image formation is image data of an one-sided document or image data of a double-sided document, preventing image formation for said blank page or blank sheet based on said judgment result.

Moreover, it is an another object to provide an image forming apparatus and a recording medium storing a computer program, which can prevent, during image formation, a necessary blank page from being excluded and suppress giving readers sense of incongruity due to lack of congruity of pages as described above, by excluding only a blank sheet whose both sides are blank pages in a case where an image is to be formed on both sides of a record sheet and where it is judged that the image data is image data of a double-sided document.

An image forming apparatus according to a first aspect is an image forming apparatus which performs image formation on an one side or both sides of a record sheet, based on image data of an one-sided document constituted of a sheet which has an object such as a character and a figure recorded on an one side thereof, or image data of a double-sided document constituted of a sheet which has objects recorded on both sides thereof, comprising: a blank page judging section for judging whether a blank page in which no object is recorded is included, based on said image data, wherein said blank page judging section judges whether a blank page is included, in a case where image formation is to be performed on an one side of a record sheet, and when said blank page judging section judges that a blank page is included, said image formation is performed excluding said blank page.

An image forming apparatus according to a second aspect is characterized by further comprising a document judging section for judging whether said image data is image data of an one-sided document or image data of a double-sided document in a case where image formation is to be performed on both sides of a record sheet, wherein when said document judging section judges that the image data is image data of an one-sided document, said blank page judging section judges whether a blank page is included, and when said blank page judging section judges that a blank page is included, said image formation is performed excluding said blank page.

An image forming apparatus according to a third aspect is characterized by further comprising a blank sheet judging section for judging whether a blank sheet whose both sides are blank pages is included based on said image data, in a case where image formation is to be performed on both sides of a record sheet and where said document judging section judges that said image data is image data of a double-sided document, wherein when said blank sheet judging section judges that a blank sheet is included, said image formation is performed excluding said both sides of the blank sheet.

An image forming method according to a fourth aspect is an image forming method for performing image formation on an one side or both sides of a record sheet, based on image data of an one-sided document constituted of a sheet which has an object such as a character and a figure recorded on an one side thereof, or image data of a double-sided document constituted of a sheet which has objects recorded on both sides thereof, comprising: a blank page judging step of judging whether a blank page in which no object is recorded is included, based on said image data; and a step of, when judgment is made as to whether a blank page is included at the blank page judging step in a case where image formation is to be performed on an one side of a record sheet and it is judged that a blank page is included, performing said image formation excluding said blank page.

An image forming method according to a fifth aspect is characterized by further comprising: a document judging step of judging whether said image data is image data of an one-sided document or image data of a double-sided document in a case where image formation is to be performed on both sides of a record sheet; and a step of, when judgment is made as to whether a blank page is included at the blank page judging step when it is judged that the image data is image data of an one-sided document at the document judging step, and it is judged that a blank page is included, performing said image formation excluding said blank page.

An image forming method according to a sixth aspect is characterized by further comprising: a blank sheet judging step of judging whether a blank sheet whose both sides are blank pages is included based on said image data, in a case where image formation is to be performed on both sides of a record sheet and it is judged that the image data is image data of a double-sided document at said document judging step; and a step of, when it is judged that a blank sheet is included at said blank sheet judging step, performing is said image formation excluding said both sides of the blank sheet.

An image forming method according to a seventh aspect is an image forming method for performing image formation on an one side or both sides of a record sheet, based on image data of an one-sided document constituted of a sheet which has an object such as a character and a figure recorded on an one side thereof, or image data of a double-sided document constituted of a sheet which has objects recorded on both sides thereof, comprising: a judging step of judging whether image formation is to be performed on an one side of a record sheet or on both sides of a record sheet; a document judging step of judging whether said image data is image data of an one-sided document or image data of a double-sided document when it is judged that image formation is to be performed on both sides of a record sheet at said judging step; a blank page judging step of judging whether a blank page in which no object is recorded is included, based on said image data, when it is judged that image formation is to be performed on an one side of a record sheet at said judging step, or when it is judged that said image data is image data of an one-sided document at said document judging step; a blank sheet judging step of judging whether a blank sheet whose both sides are blank pages is included based on said image data, when it is judged that image formation is to be performed on both sides of a record sheet at said judging step and it is judged that said image data is image data of a double-sided document at said document judging step; a step of, when it is judged that a blank page is included at said blank page judging step, performing image formation excluding said blank page; and a step of, when it is judged that a blank sheet is included at said blank sheet judging step, performing image formation excluding said both sides of the blank sheet.

In the first, fourth and seventh aspects, said blank page judging section judges whether a blank page is included based on said image data in a case where an image is to be formed on an one side of a record sheet, and when said blank page judging section judges that a blank page is included, image formation is performed excluding said blank page.

In the second and fifth aspects, said document judging section judges whether said image data is image data of an one-sided document or image data of a double-sided document in a case where image formation is to be performed on both sides of a record sheet, when said document judging section judges that the image data is image data of an one-sided document, said blank page judging section judges whether a blank page is included, and when said blank page judging section judges that a blank page is included, image formation is performed excluding said blank page.

In the third and sixth aspects, said document judging section judges whether said image data is image data of an one-sided document or image data of a double-sided document in a case where image formation is to be performed on both sides of a record sheet, and when said document judging section judges that said image data is image data of a double-sided document, said blank sheet judging section judges whether a blank sheet is included based on said image data. When said blank sheet judging section judges that a blank sheet is included, image formation is performed excluding said both sides of blank sheet.

According to the first through the seventh aspects, it is judged whether a blank page or a blank sheet is included based on whether image formation is to be performed on an one side or both sides of record paper, and on whether image data concerning image formation is image data of an one-sided document or image data of a double-sided document, and image formation is prevented for said blank page or blank sheet based on the result of said judgment. Therefore it is possible to remove only an unnecessary blank page, and effectively prevent lowering of efficiency due to image formation of an unnecessary blank page.

According to the first through the seventh aspects, in a case where image formation is to be performed on both sides of a record sheet, and where said document judging section judges that the image data is image data of a double-sided document, since only a blank sheet is excluded from image formation, it is possible to prevent a necessary blank page from being excluded, and suppress giving readers sense of incongruity due to lack of the congruity of pages.

The above and further objects and features will more fully be apparent from the following detailed description with accompanying drawings.

DETAILED DESCRIPTION

Referring to the drawings, the following will explain a mode in which an image forming apparatus according to the present embodiment is applied to a digital complex machine including a copy function, a print function, etc., in detail.

Embodiment 1

Figure 1:
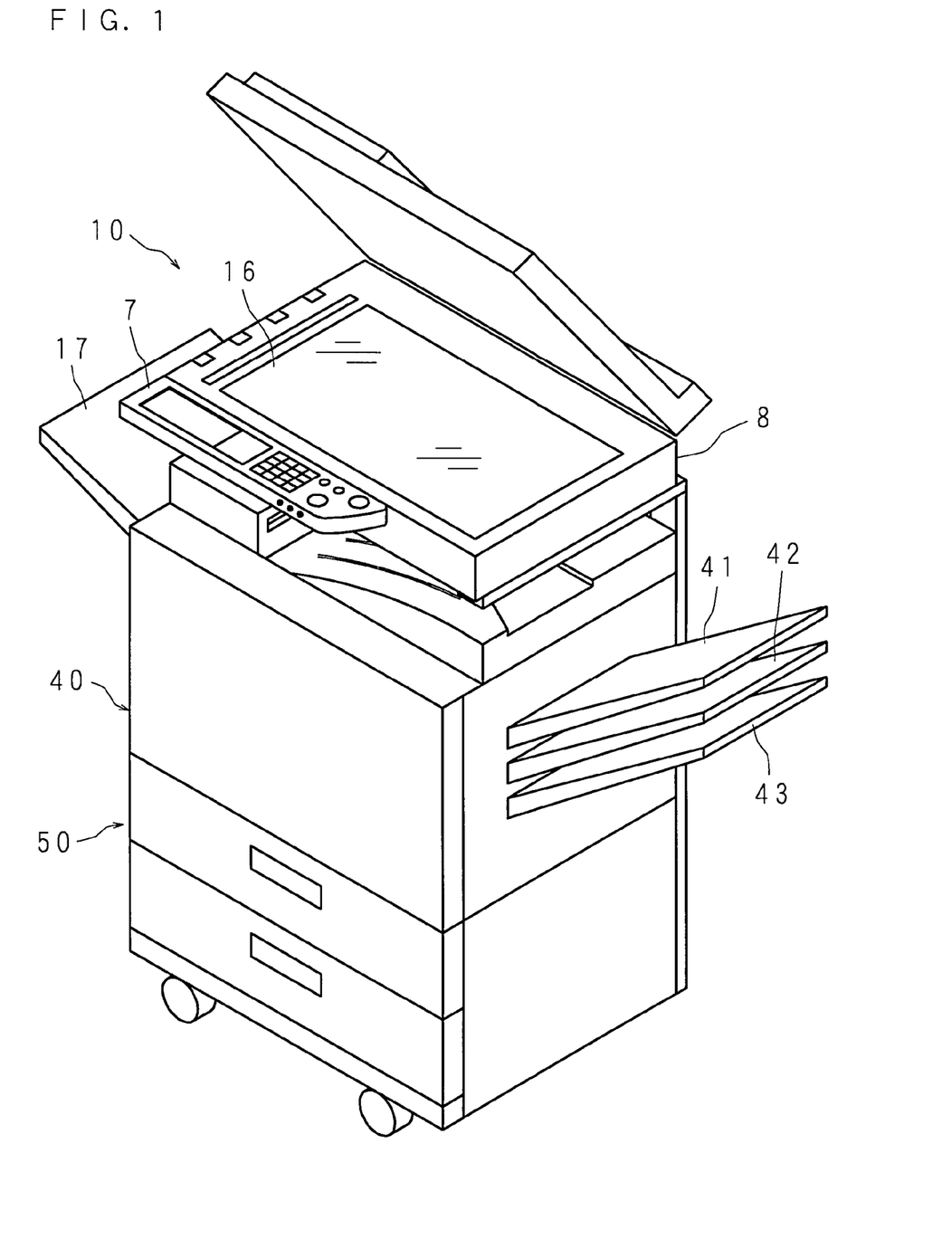
FIG. 1 is a perspective view showing an example of a digital complex machine according to Embodiment 1.
Figure 2:
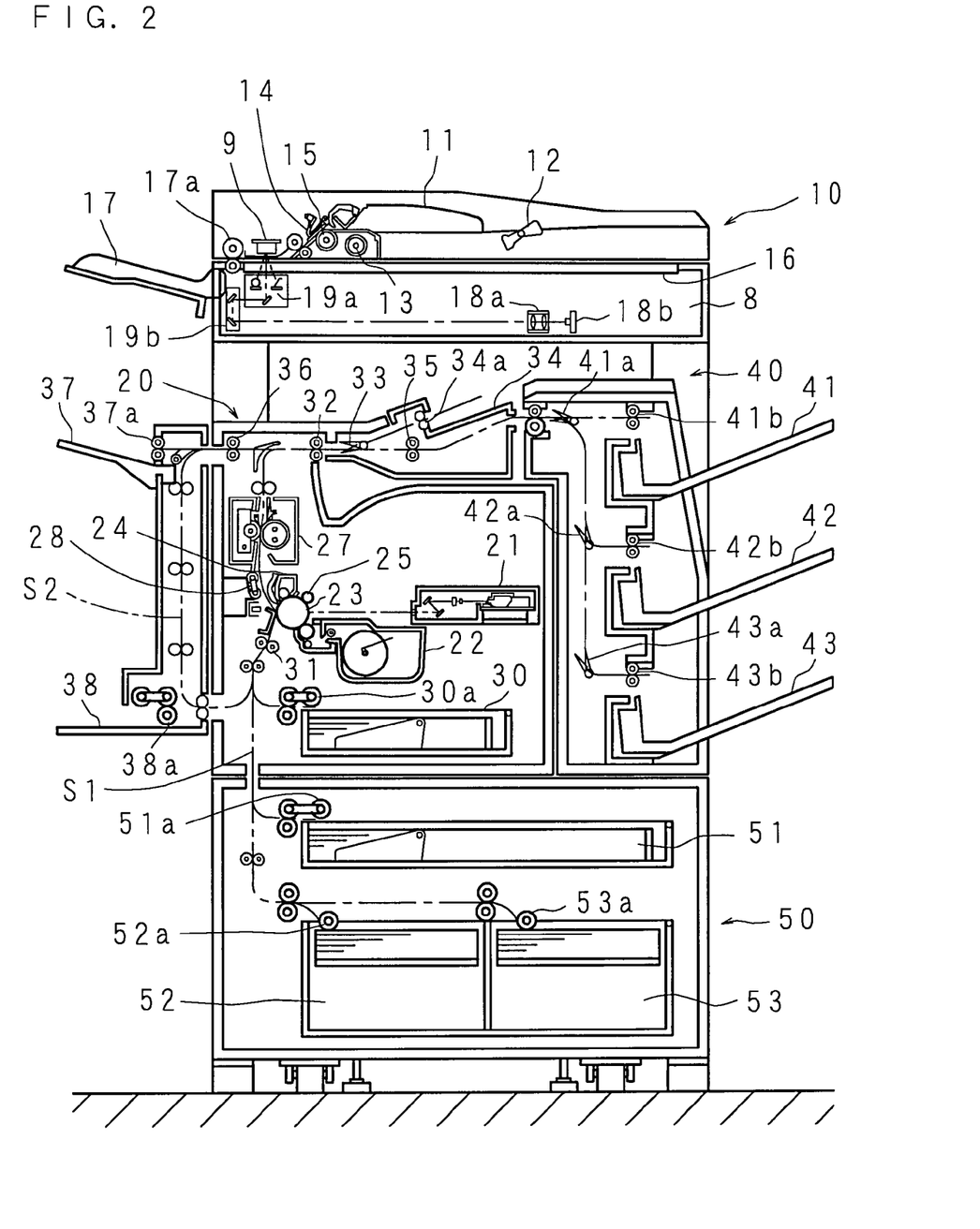
FIG. 2 is a schematic sectional view showing an internal configuration of the digital complex machine according to Embodiment 1.

FIG. 1 is a perspective view showing an example of the digital complex machine according to the present embodiment, and FIG. 2 is a schematic sectional view showing an internal configuration of the digital complex machine according to the present embodiment. A document reading section 10 is disposed in the top side of the digital complex machine, and an image forming section 20 and a discharging section 40 are disposed under the document reading section 10, and a feed section 50 is disposed under the image forming section 20 and the discharging section 40.

The document reading section 10 includes ADF (Automatic Document Feeder) for taking in a document which consists of a plurality of sheets sequentially, a document table 16 for laying a document to be read in an aligned state, a control panel 7 for receiving a user's instruction, a read unit 8 for reading an image (object) of a document taken in by the ADF or an image of a document laid on the document table 16 and a rear read unit 9.

The ADF disposed to the document reading section 10 is provided with a document tray 11 for laying a document for reading face up, a pickup roller 13 for taking in a document laid on the document tray 11 one sheet at a time from the top, a separating board 14 which prevents two or more sheets of a document from being taken in, a conveyance roller 15 which conveys a sheet of document taken in by the pickup roller 13 to the document table 16, a discharge tray 17 for discharging a sheet of document after reading an image, a discharge roller 17a which discharges a document to the discharge tray 17 after reading an image, a document detecting sensor 12 which detects existence or nonexistence of a document on the document tray 11.

The read unit 8 disposed to the document reading section 10 is provided with a light source unit 19a, a mirror unit 19b, a focus lens 18a, and a CCD 18b in order to read an image recorded on a surface of a sheet of document.

The light source unit 19a condenses illumination light for reading irradiated from an exposure lamp on a proper reading position of the document table 16 by a concave reflector, changes an optical path of light reflected from a sheet of document 90 degrees with a mirror which is installed so that its reflective surface forms 45 degrees with respect to a surface of the document table 16, leads the optical path to the mirror unit 19b. The mirror unit 19b is provided with a pair of mirrors arranged so that their reflective surfaces mutually intersect perpendicularly, in order to change an optical path of light changed 90 degrees by the mirror of the light source unit 19a further 180 degrees. When reading a sheet of a document fed from the ADF, an image is read with the light source unit 19a held at a predetermined reading position, and when reading a sheet of document set on the document table 16, the light source unit 19a scans in parallel with the surface of the document table 16.

The light led by the mirror unit 19b focuses on the CCD 18b by a function of the focus lens 18a. The CCD 18b is provided with thousands of photocells which are arranged on a substantially straight line. Each photocell performs photoelectric conversion, converts incident light into an analog electrical signal according to the quantity of the light, and outputs the signal. The analog electrical signal outputted from the CCD 18b is converted into a digital signal by an A-D converter (not shown), is compensated to correct the light distribution characteristic of the light source at the time of reading the document, sensitivity unevenness of the CCD 18b, or the like, and then, is generated as image data. The generated image data is outputted to a below-mentioned image memory 105 (see FIG. 3).

On the other hand, the rear read unit 9 reads a rear face (upper side face) of a document. The rear read unit 9 is arranged above the document table 16, and is provided with an exposure lamp (an LED array, a fluorescent light, etc.) which irradiates a rear face of a document, a selfoc lens array which condenses light reflected from a sheet of document for each pixel, and a contact image sensor (CIS; Contact Image Sensor) which performs photoelectric conversion of the light reflected from a sheet of document received through the selfoc lens array and outputs an analog image signal, or the like.

The image forming section 20 includes an electrophotograph type process part which has a photo conductor drum 23, a charger 25 which charges the photo conductor drum 23, a laser writing device 21 which writes a latent image on the charged photo conductor drum 23, a developing unit 22 which develops a latent image on the photo conductor drum 23, a cleaning unit 24 which removes a developer which remains on the photo conductor drum 23 and regenerates the photo conductor drum 23, a transfer device 28 which transfers a toner on a surface of the photo conductor drum 23 to record paper, or the like, and performs image formation by conveying a sheet of paper to this process part. A branching pawl is disposed at a merging position of a main conveyance path S1 for printing only on an one side of a sheet of record paper and a reverse conveyance path S2 for printing on both sides of a sheet of record paper, and reverses two sides of a sheet of record paper according to record formats in printing, i.e. print modes (double-sided printing or one-sided printing, blackand-white printing or color printing, etc.) which show whether printing is to be performed on an one side of record paper or on both sides thereof, or the like.

Moreover the image forming section 20 includes a sheet feeder cassette 30 for accommodating sheets of paper under (upstream) the process part, and the accommodated sheets of paper are separated and fed one sheet at a time by a pickup roller 30a placed near the main conveyance path S1. When a sheet of paper separated and fed from the sheet feeder cassette 30 is conveyed to the process part, the paper is once held by a registration roller 31. The registration roller 31 controls a timing at which a leading edge of a toner image on the photo conductor drum 23 is aligned with a leading edge of an image formation area of the sheet of paper, based on a detection signal of a pre-registration detecting switch (not shown), and convey the sheet to the process part in conformity to a rotation of the photo conductor drum 23.

The feed section 50 is disposed under the image forming section 20, and includes sheet feeder cassettes 51, 52, and 53 for accommodating several sorts of paper. In the feed section 50, as mentioned above, the accommodated sheets of paper are separated and fed by pickup rollers 51a, 52a, and 53a mounted on the sheet feeder cassettes 51, 52, and 53 respectively, one sheet at a time, and are conveyed through the main conveyance path S1 to the process part of the image forming section 20.

A sheet of paper in which a toner image is transferred in the process part is conveyed to a fixing unit 27 mounted downstream of the process part. The fixing unit 27 is provided with a heating roller and a pressurizing roller, rotates the two rollers with a sheet of paper on which a toner image is transferred being held between these two rollers, and fixes the toner image on paper with heat of the heating roller.

The sheet of paper on which the toner image is fixed with heat by the fixing unit 27 is discharged to any of several discharge trays with which this digital complex machine is provided. In a default setup, a sheet of paper to be discharged is discharged on a discharge tray 34 in the state of facedown through a discharge roller 34a, by controlling a conveyance roller 32 and a switching gate 33 so as to lead the sheet to the discharge tray 34. On the other hand, when it is specified to discharge a sheet of paper to a discharge tray 41 with which the discharging section 40 is provided, the switching gate 33 is switched, a sheet of paper is led to the discharging section 40 by a conveyance roller 35, and the sheet is discharged on the discharge tray 41 through a switching gate 41a and a discharge roller 41b. The process is the same when discharging a sheet of paper to a discharge tray 42 (or a discharge tray 43), a conveyance path is controlled by the switching gates 41a, 42a, and 43a, and a sheet of paper is discharged to a target tray by driving a discharge roller 42b (or a discharge roller 43b).

When discharging a sheet of paper in the state of faceup, or when performing image formation on both sides of a sheet of paper, after holding a sheet by the conveyance rollers 32, 35 once, the conveyance rollers 32, 35 are driven to rotate in an opposite direction, and the sheet is led to the double-sided document conveyance path S2 by a conveyance roller 36. When discharging a sheet of paper in the state of faceup, the sheet is discharged to a discharge tray 37 through a discharge roller 37a. When performing image formation on both sides of a sheet of paper, the sheet is again led to the registration roller 31 of the image forming section 20 via the double-sided document conveyance path S2, and a toner image is formed on the rear face side of the sheet in the process part of the image forming section 20. A manual feed tray 38 is disposed on the lower end side of the double-sided document convey-ance path S2, and is constituted so that a kind of paper which is not accommodated in the sheet feeder cassettes 30, 51, 52, and 53 is taken in by a pickup roller 38a.

Figure 3:
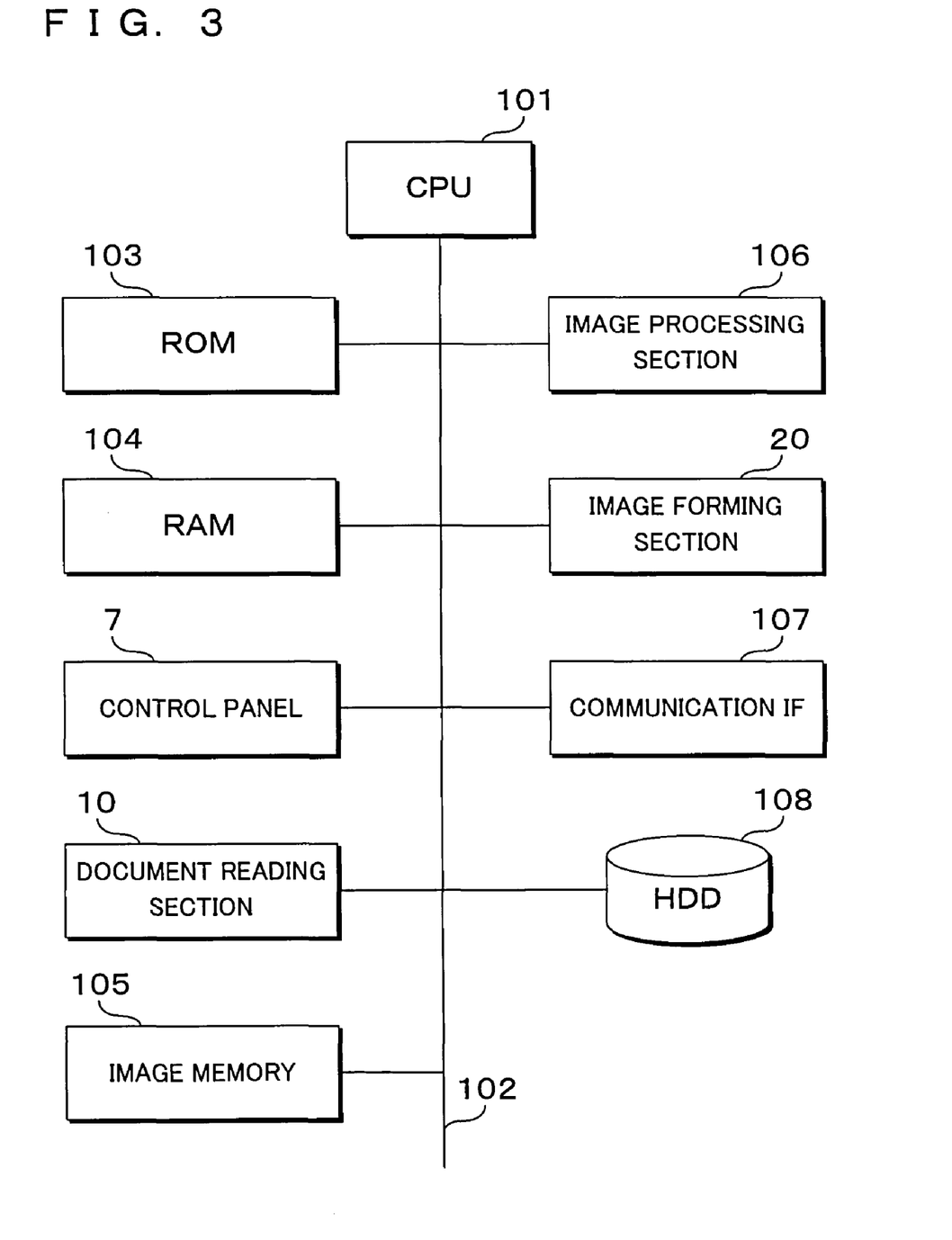
FIG. 3 is a block diagram showing a constitution of an essential part of the digital complex machine according to Embodiment 1.

FIG. 3 is a block diagram showing a constitution of an essential part of the digital complex machine according to the present embodiment. The digital complex machine is provided with the CPU 101, and the CPU 101 is connected via a bus 102 to the above-mentioned document reading section 10 and image forming section 20, and further is connected to hardware of a ROM 103, a RAM 104, the control panel 7, the image memory 105, an image processing section 106, a communication IF 107 and a HDD 108, or the like.

By loading on the RAM 104 a control program beforehand stored in the ROM 103 and executing it, the CPU 101 controls the above-mentioned various hardware and operates the whole apparatus as an image forming apparatus according to the present embodiment. Based on image data of an object file concerning a user's printing instruction, a judgment of whether a blank page exists, and a judgment of whether a blank sheet whose both sides are blank pages exists, or the like are performed.

The control panel 7 is constituted by an operation unit which receives an operation by a user, and a display unit which displays information to be reported to a user. The operation unit is provided with various operation keys, numerical keys, a start key, etc., in order to receive a setting of a switching operation of functions, the output number of sheets in print processing, a scale factor in copy processing, etc. The display unit is provided with a liquid crystal display device, and displays an operation situation of the digital complex machine, the set value inputted from the operation unit, or the like.

The image memory 105 is a volatile page memory for example, and memorizes temporarily image data obtained by the document reading section 10, image data concerning a print job received through the below-mentioned communication IF 107, image data to be processed by the image processing section 106, etc. by the page or by the sheet.

The image processing section 106 performs processing specified in the control panel 7 or a print job with respect to image data memorized in the image memory 105. For example, the image processing section 106 performs processing of expansion, reduction, etc. based on said image data.

The communication IF 107 is provided with an interface for connecting with communication networks, such as a local area network and the Internet network. The digital complex machine establishes a connection with an external device via the communication IF 107, sends various data to the external device with which the connection is established, and receives various data from the external device. The communication IF 107 also has a terminal for connecting with a portable recording medium.

Figure 4A:
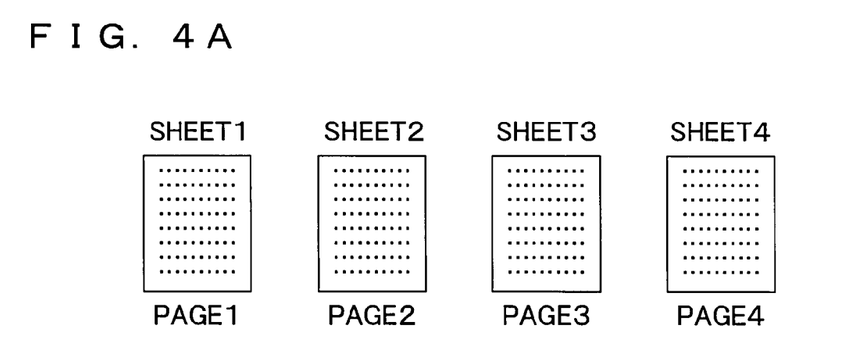
FIGS. 4A and 4B are conceptual diagrams showing an example of a storage region of a HDD of the digital complex machine according to Embodiment 1.
Figure 4B:
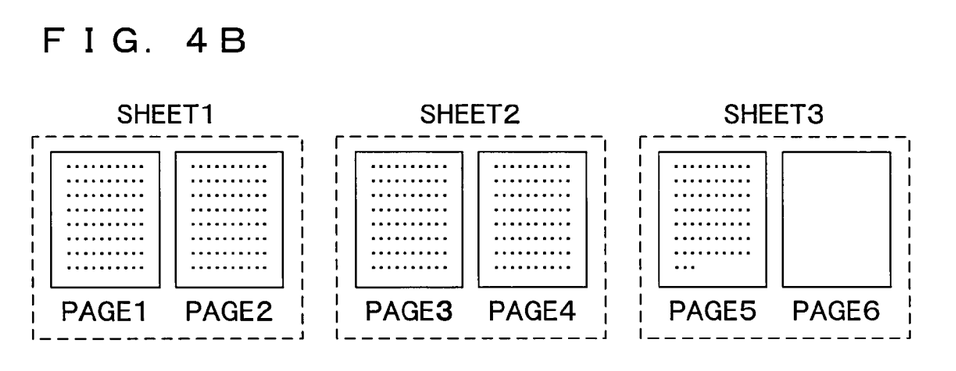

The HDD 108 is a storage device which has a magnetic recording medium, and a storage region thereof is used as a data storage region which memorizes various kinds of data. As data memorized in the HDD 108, there are image data obtained by reading a document by the document reading section 10, image data concerning a print job received by the communication IF 107, or the like. When a document read by the document reading section 10 is a document which consists of a plurality of sheets, image data of said document is memorized with a page thereof relating with a sheet thereof. FIGS. 4A and 4B are a conceptual diagram showing an example of the storage region of the HDD 108. For example, a case where the document reading section 10 reads a document whose document format is an one-sided document, i.e., a document in which an object such as a character and a figure, is recorded on an one side of each of a plurality of sheets, or a case where the document reading section 10 reads a document whose document format is a double-sided document, i.e., a document in which objects lo are recorded on both sides of a plurality of sheets, is explained as an example. FIG. 4A shows a case where a document format of said document is an one-sided document, and FIG. 4B shows a case where a document format of said document is a double-sided document. When a document format of a document is an one-sided document, since an image, such as a figure and a character, is contained only in an one side of each sheet, an image of one page is assigned to each sheet. On the other hand, when a document format of a document is a double-sided document, since images are contained in both sides of each sheet, images of two pages are assigned to each sheet. These image data is associated and is memorized with management information of a document (file). Management information of a document is a capacity, a maker, the date and time of creation, and a document mode that is the form of said document (a double-sided document or an one-sided document, a black-and-white document or a color document, etc.), for example. Image data memorized by the HDD 108 is read, for example, when a user's instruction is received through the control panel 7.

Next, an operation of the digital complex machine is explained taking a case where a copy function is performed for example. For example, when a document to be an object which consists of a plurality of sheets (hereafter an object document) is set on the document tray 11 of the document reading section 10, the document detecting sensor 12 detects that a document is set. And an input of a size, a scale factor, a print mode (double-sided printing or one-sided printing, black-and-white printing or color printing, etc.), or the like of record paper (record sheet) is received via the control panel 7 of the document reading section 10. Then, when an instruction to start copying is received via the control panel 7, in the document reading section 10, a document on the document tray 11 is taken in one sheet at a time by the pickup roller 13, and it is sent out between the separating board 14 and the conveyance roller 15 to the document table 16. The sent-out document is conveyed on the document table 16 in a sub scanning direction, and is discharged to the discharging tray 17.

At the time, a surface (lower surface) of a sheet of document is read by the read unit 8. The light source unit 19a of the read unit 8 is moved to a proper position, the mirror unit 19b is moved to a predetermined position, and the surface of the sheet is irradiated via the document table 16 by the exposure lamp of the light source unit 19a. The light reflected from the document is led to the focus lens 18a by each reflective mirror of the light source unit 19a and the mirror unit 19b, and is condensed to the CCD 18b by the focus lens 18a. And an image of the surface of the document is formed on the CCD 18b, thereby reading the image of the surface of the document.

It is also possible to lay a sheet of document on the document table 16 of the document reading section 10, and read a surface of the sheet by the read unit 8 in this state. In this case, the light source unit 19a and the mirror unit 19b are moved in the sub scanning direction while maintaining a predetermined speed relation mutually, the sheet on the document table 16 is exposed by the light source unit 19a, the light reflected from the sheet is led to the focus lens 18a by the light source unit 19a and the mirror unit 19b, and an image of the sheet is formed on the CCD 18b by the focus lens 18a.

On the other hand, when reading a rear face (upper face) of a sheet of document, at a time when the sheet passes between the rear read unit 9 and the document table 16 and is discharged to the discharge tray 17 by the discharge roller 17a, reading is performed by the rear read unit 9.

Thus, when an one side or both sides of a sheet of document is read, image data of the one side or both sides of the sheet is memorized by the image memory 105, image processing by the image processing section 106 is performed if needed, and this image data is outputted to the image forming section 20. The image forming section 20 prints an image based on said image data on a sheet of record paper.

As mentioned above, the main conveyance path S1 and the reverse conveyance path S2 are disposed in the image forming section 20, and a sheet of record paper fed from the feed section 50 is conveyed along the main conveyance path S1. The feed section 50 takes in a sheet of record paper accommodated in the sheet feeder cassette 52 or a sheet of record paper laid in the manual feed tray 38 one sheet at a time, and sends out the sheet to the main conveyance path S1 of the image forming section 20.

One sheet of record paper conveyed along the main conveyance path S1 of the image forming section 20 passes between the photo conductor drum 23 and the transfer device 28, and also passes through the fixing unit 27. And then printing is performed on the record paper. The photo conductor drum 23 rotates in one direction, and after the surface thereof is cleaned by the cleaning unit 24 and an electric discharger (not shown), the surface thereof is uniformly charged by the charger 25. The laser writing device 21 modulates a laser beam based on image data obtained by the document reading section 10, repeatedly scans the surface of the photo conductor drum 23 in a main scanning direction by this laser beam, and forms an electrostatic latent image on the surface of the photo conductor drum 23. The developing unit 22 supplies a toner to the surface of the photo conductor drum 23, develops the electrostatic latent image, and forms a toner image on the surface of the photo conductor drum 23. The transfer device 28 transfers the toner image of the surface of the photo conductor drum 23 on a sheet of record paper which passes between said transfer device 28 and the photo conductor drum 23. The fixing unit 27 heats and pressurizes the sheet, and fixes the toner image on the sheet.

When printing only on an one side of record paper, a sheet of record paper from the fixing unit 27 is led to the discharge tray 34 or the discharging section 40 by the branching pawl. When printing on both sides of record paper, the branching pawl is moved to rotate and a sheet of record paper is led to the reverse conveyance path S2. And the record paper passes through the reverse conveyance path S2, is conveyed again to the main conveyance path S1 with the both faces thereof reversed, and in the middle of conveyance of the main conveyance path S1 for the second time, printing is performed on a rear face thereof and the sheet is led to the discharge tray 34 or the discharging section 40.

The record paper printed thus is led to the discharge tray 34 or the discharging section 40, and is discharged to the discharge tray 34 or one of the discharge trays 41, 42, and 43 of the discharging section 40. The discharging section 40 classifies a plurality of sheets of record paper to discharge them to the respective discharge trays 41, 42, and 43, performs punching processing on the sheets of record paper, and performs stapling processing on the sheets of record paper.

Figure 5:
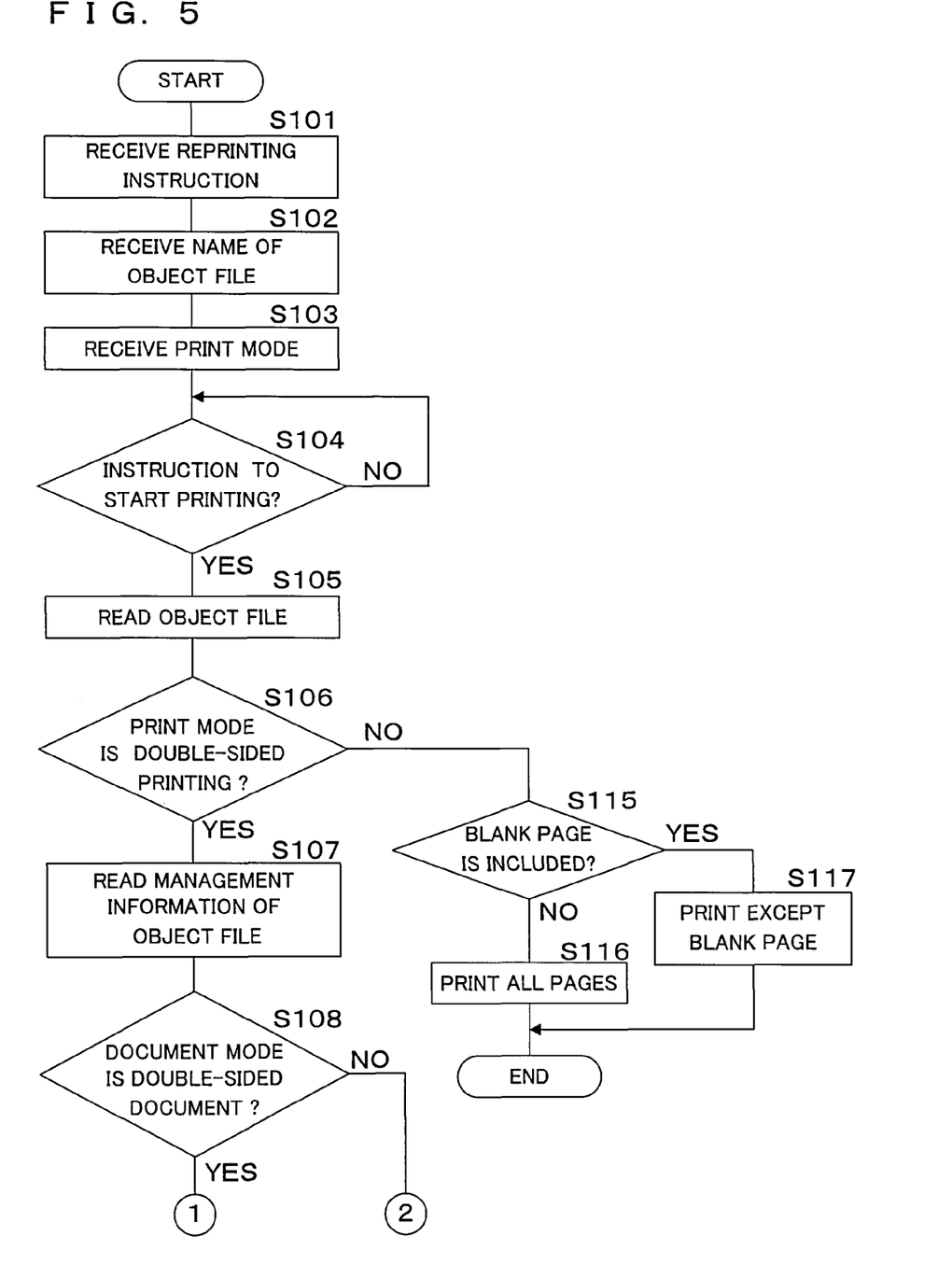
FIG. 5 is a flow chart showing steps of a process of CPU of the digital complex machine according to Embodiment 1.
Figure 6:
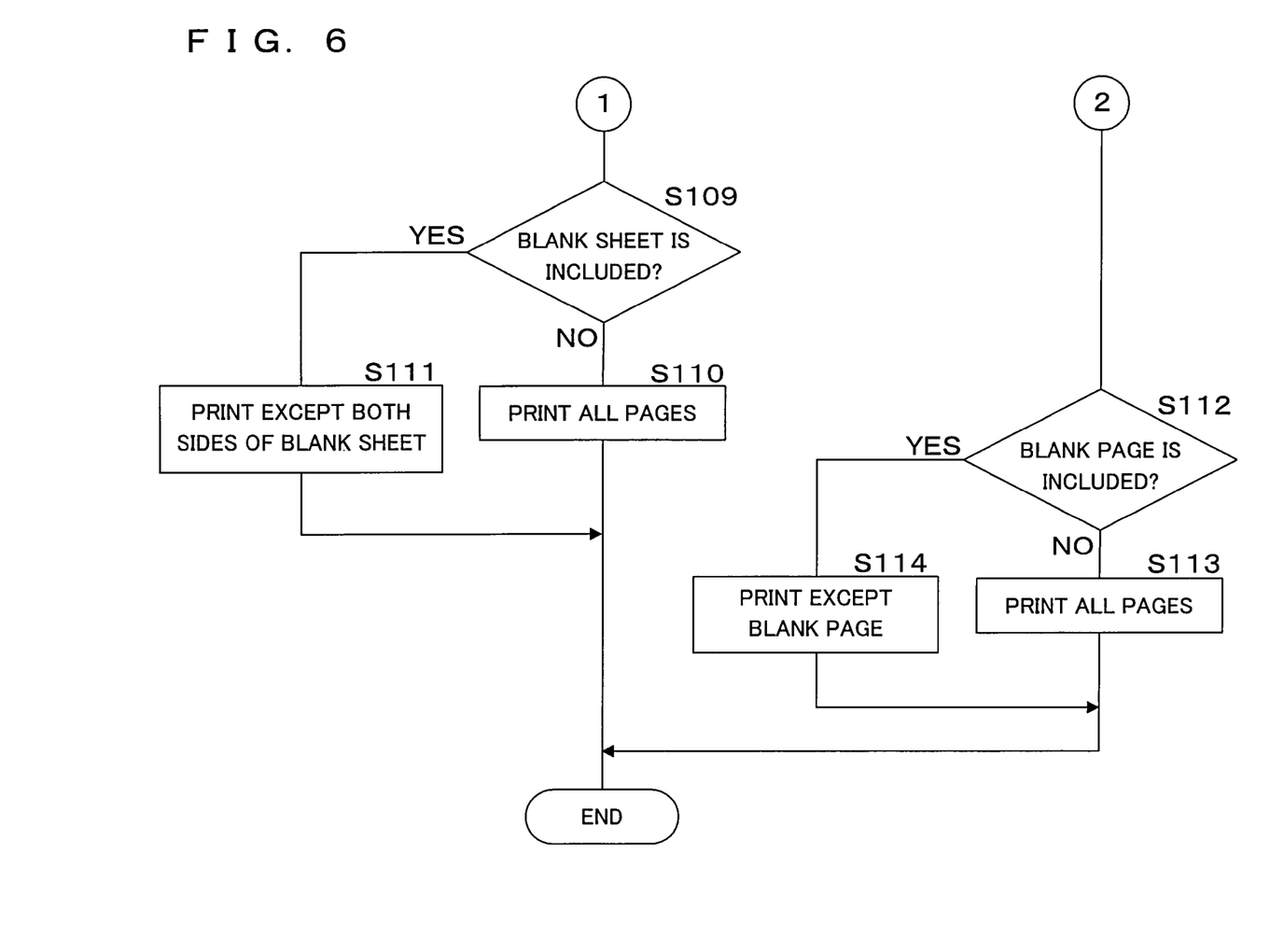
FIG. 6 is a flow chart showing steps of a process of CPU of the digital complex machine according to Embodiment 1.

FIGS. 5 and 6 are flow charts showing steps of a process of the CPU 101 of the digital complex machine according to the present embodiment. For convenience of explanation, it is assumed that the digital complex machine according to the present embodiment has a reprinting function with which image data to be printed is selected by a user out of image data, which is already read and is memorized by the HDD 108, and the image data is printed. Hereafter, steps of a process of the CPU 101 of the digital complex machine according to Embodiment 1 are explained by taking said reprinting processing for example.

The CPU 101 receives a reprinting instruction via the control panel 7 by a user's operation of the operation unit of the control panel 7 and selection of reprinting (S101). Subsequently, the CPU 101 receives an input of a name of an object file (object document) via the control panel 7 by the user's operation of the operation unit of the control panel 7 and selection of the object file to be printed out of image data memorized in the HDD 108 (S102). Data concerning the received object file name is stored temporarily in the RAM 104. Subsequently, the user operates the operation unit of the control panel 7, and inputs a print mode (record format), such as double-sided printing or one-sided printing, black-and-white printing or color printing, etc., and the CPU 101 receives an input of the print mode via the control panel 7 (S103). Data concerning the is received print mode is stored temporarily in the RAM 104.

Subsequently, the CPU 101 judges whether there is an instruction to start printing by supervising an operation of a start key of the control panel 7 (S104). When there is no instruction to start printing (S104: NO), the CPU 101 waits for an instruction to start printing. When an instruction to start printing is given (S104: YES), image data of an object file memorized in the HDD 108 is read based on data concerning an object file name memorized in the RAM 104 (S105), and the image data is memorized in the image memory 105.

The CPU 101 judges whether a print mode is double-sided printing, based on data concerning a print mode memorized in the RAM 104 (S106). When the CPU 101 judges that the print mode is not double-sided printing (S106: NO), that is, the print mode is one-sided printing, it judges whether a blank page is included in said object file based on image data of said object file memorized in the image memory 105 (S115). This judgment is performed by judging whether there is any blank page, regardless of whether a document mode of an object file is an one-sided document or a double-sided document. The judgment of whether there is any blank page may be performed, for example, by retrieving binary image data from image data of each page of an object file, judging that, if there is a page in which not less than 99% of signals have values 0 for example, the page is a blank page, and judging that a blank page is included in the object file. Alternatively, the judgment of whether there is any blank page may be performed by dividing each page of an object file into several areas, judging whether each area is a colored area, and judging that the page is a blank page when it is judged that the number of areas that are judged to be colored is zero or a value no more than a predetermined value.

When the CPU 101 judges that a blank page is not included in said object file (S115: NO), all the pages of said object file are printed (S116). That is, the image forming section 20 performs printing based on image data of said object file memorized in the image memory 105.

On the other hand, when the CPU 101 judges that a blank page is included in said object file (S115: YES), printing is performed excluding said blank page from pages of said object file (S117). That is, the image forming section 20 prints only pages other than said blank page based on image data of said object file memorized in the image memory 105.

Figure 7A:
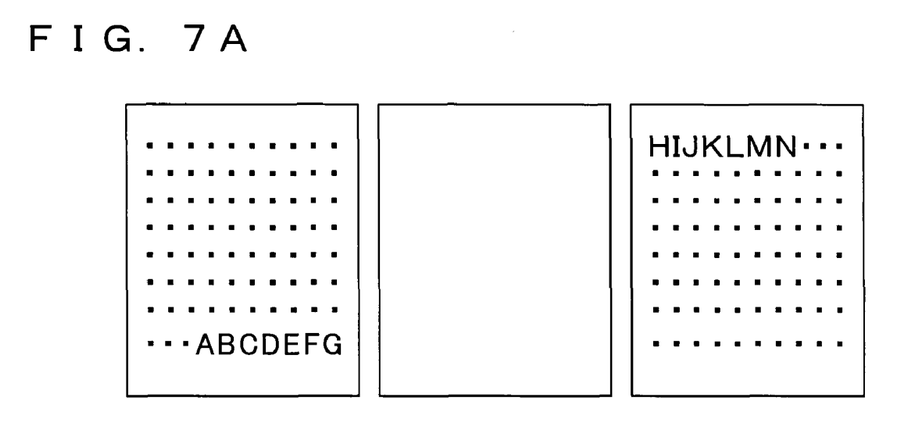
FIGS. 7A, 7B and 7C are illustration views showing an example of a processing result by the digital complex machine according to Embodiment 1.
Figure 7B:
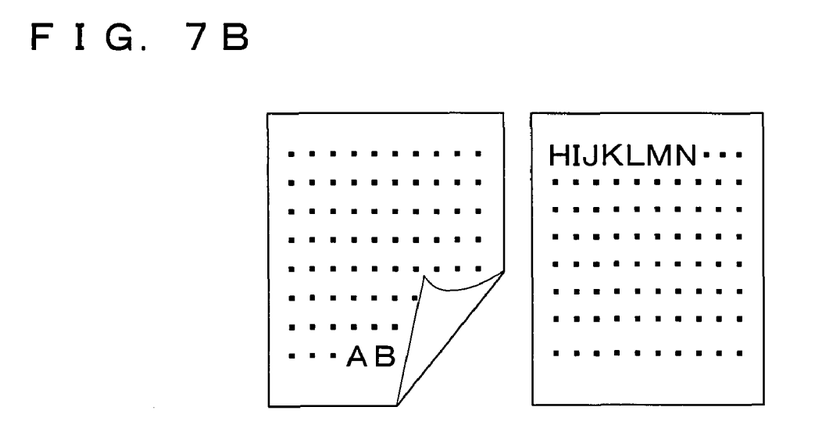
Figure 7C:
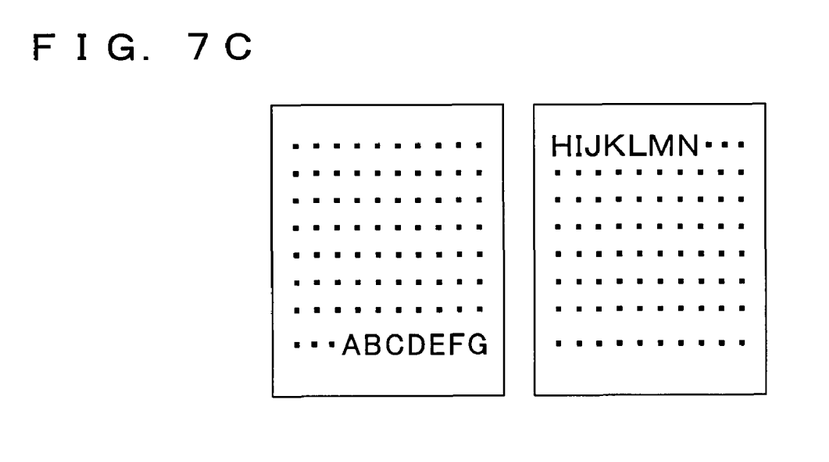

FIGS. 7A to 7C are illustration views showing an example of a processing result by the digital complex machine according to the present embodiment. FIG. 7A shows an object file whose document mode is an one-sided document. FIG. 7B shows an object file whose document mode is a double-sided document, and FIG. 7C is an illustration view showing an object file obtained after the printing of an object file of FIGS. 7A and 7B in case where a print mode is one-sided printing. For example, considering the cases where a document mode is an one-sided document and an object file consists of three sheets including one blank page, where a document mode is a double-sided document and an object file consists of two sheets, a rear surface of one sheet of the two sheets being a blank page, and where a print mode is one-sided printing, it turns out that, in any of the cases, one-sided printing of only pages other than each blank page is performed by processing of the digital complex machine according to the present embodiment.

When the CPU 101 judges that a print mode is double-sided printing in S106 (S106: YES), management information of an object file memorized in the HDD 108 is read (S107), and it is memorized in the RAM 104. Subsequently, the CPU 101 judges whether a document mode of an object file is a double-sided document (S108). When the CPU 101 judges that the document mode of the object file is not a double-sided document (S108: NO), it judges whether a blank page is included in said object file based on image data of said object file memorized in the image memory 105 (S112). This judgment is performed by the same method as the above-mentioned method.

When the CPU 101 judges that a blank page is not included in said object file (S112: NO), all the pages of said object file are printed (S113). That is, the image forming section 20 performs printing based on image data of said object file memorized in the image memory 105.

On the other hand, when the CPU 101 judges that a blank page is included in said object file (S112: YES), printing is performed excluding said blank page from pages of said object file (S114). That is, the image forming section 20 prints only pages other than said blank page based on image data of said object file memorized in the image memory 105.

Figure 8A:
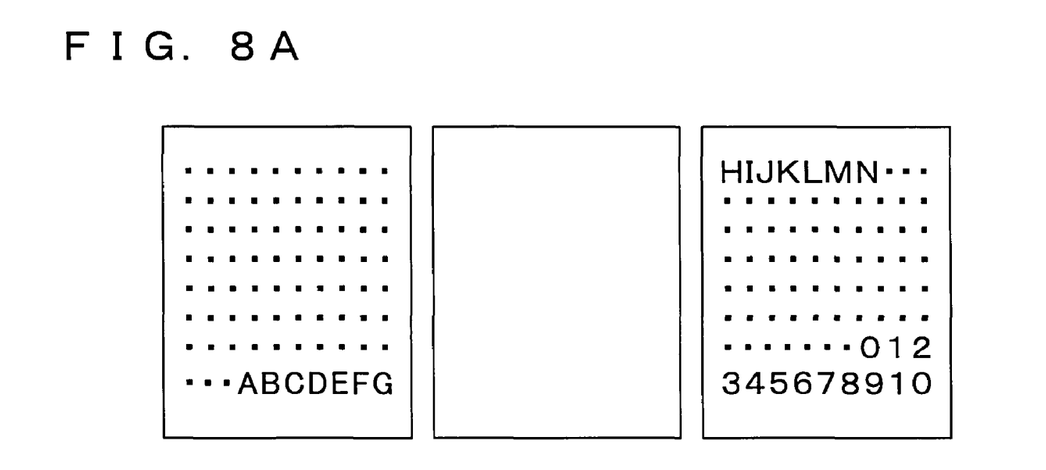
FIGS. 8A and 8B are illustration views showing an example of a processing result by the digital complex machine according to Embodiment 1.
Figure 8B:
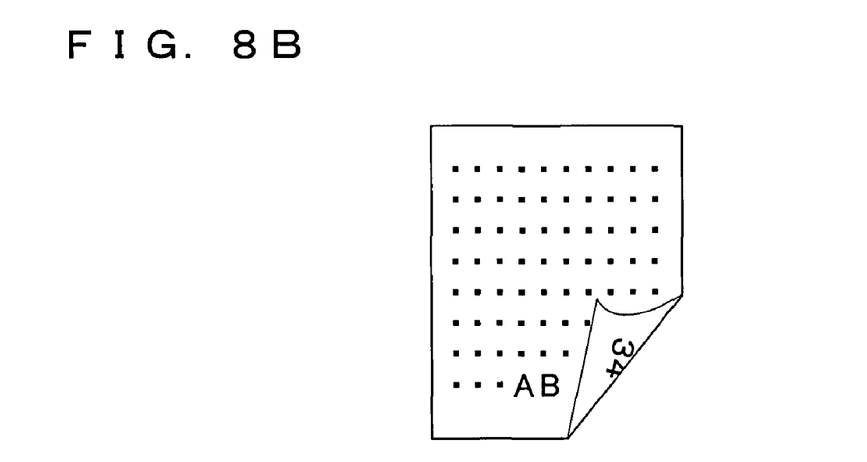

FIGS. 8A and 8B are illustration views showing an example of a processing result by the digital complex machine according to the present embodiment. FIG. 8A shows an object file whose document mode is an one-sided document, and FIG. 8B is an illustration view showing an object file obtained after printing of an object file of FIG. 8A in a case where a print mode is double-sided printing. For example, when a document mode is an one-sided document and an object file consists of three sheets including one blank page, and when a print mode is double-sided printing, it turns out that double-sided printing of only pages other than the blank page is performed by processing of the digital complex machine according to the present embodiment.

When the CPU 101 judges that a document mode is a double-sided document in S108 (S108: YES), it judges whether a blank sheet whose both sides are blank pages is included in said object file, based on image data of said object file memorized in the image memory 105 (S109). This judgment that the sheet is a blank sheet may be performed, for example, by judging whether two or more blank pages are included in said object file, and if any, judging whether there are two blank pages among said two or more blank pages concerning one sheet.

When the CPU 101 judges that a blank sheet is not included in said object file (S109: NO), all the pages of said object file are printed (S110). That is, the image forming section 20 performs printing based on image data of said object file memorized in the image memory 105.

On the other hand, when the CPU 101 judges that a blank sheet is included in said object file (S109: YES), it performs printing excluding both sides of said blank sheet (S111). That is, the image is forming section 20 prints only pages other than blank pages concerning both sides of said blank sheet based on image data of said object file memorized in the image memory 105.

Figure 9A:
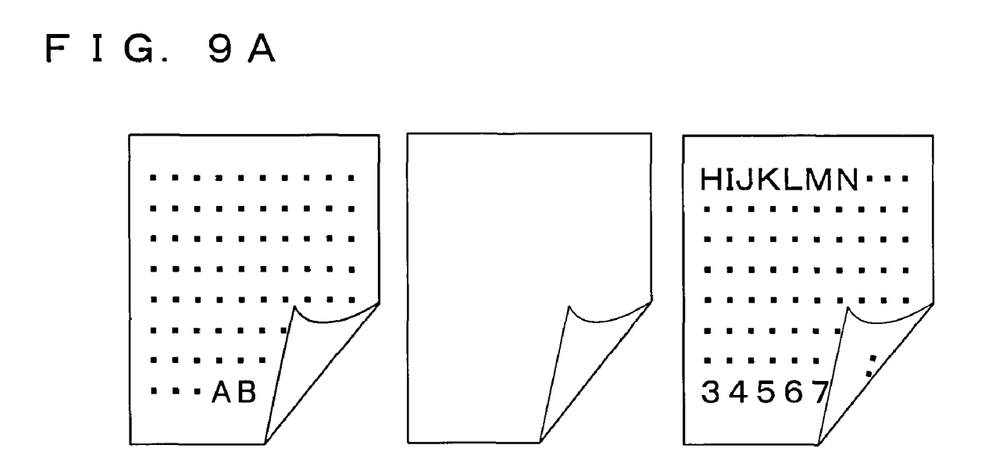
FIGS. 9A and 9B are illustration views showing an example of a processing result by the digital complex machine according to Embodiment 1.
Figure 9B:
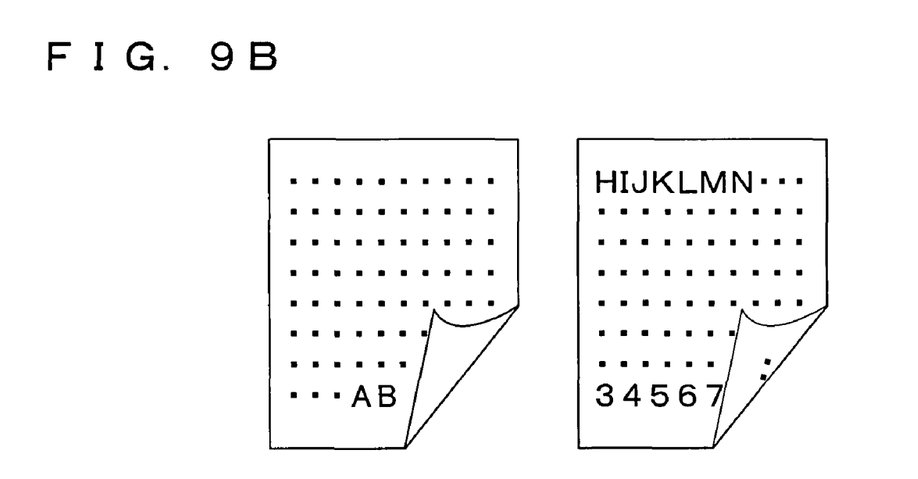

FIGS. 9A and 9B are illustration views showing an example of a processing result by the digital complex machine according to the present embodiment. FIG. 9A shows an object file whose document mode is a double-sided document, and FIG. 9B is an illustration view showing an object file obtained after printing of an object file of FIG. 9A in a case where a print mode is double-sided printing. For example, when a document mode is a double-sided document and an object file consists of three sheets including one sheet only the rear face of which is a blank page and one blank sheet whose both sides are blank pages, and when a print mode is double-sided printing, it turns out that the double-sided printing of pages is performed excluding only a blank sheet whose both sides are blank pages by processing of the digital complex machine of the present embodiment.

By performing the processing as described above, the digital complex machine according to the present embodiment can remove a blank page more precisely, preventing a necessary blank page from being excluded, and can suppress the collapse of congruity of pages before and after printing.

In Embodiment 1, although processing of the digital complex machine according to the present embodiment is explained by taking a case of reprinting for example, the processing is not limited to this. Needless to say, it can be applied also to so-called copying in which an object document is read and printing (image formation) is performed based on image data of the read object document. For example, when copying, the effect of the present embodiment as mentioned above can be achieved by constituting so that a user inputs a document mode.

Embodiment 2

Figure 10:
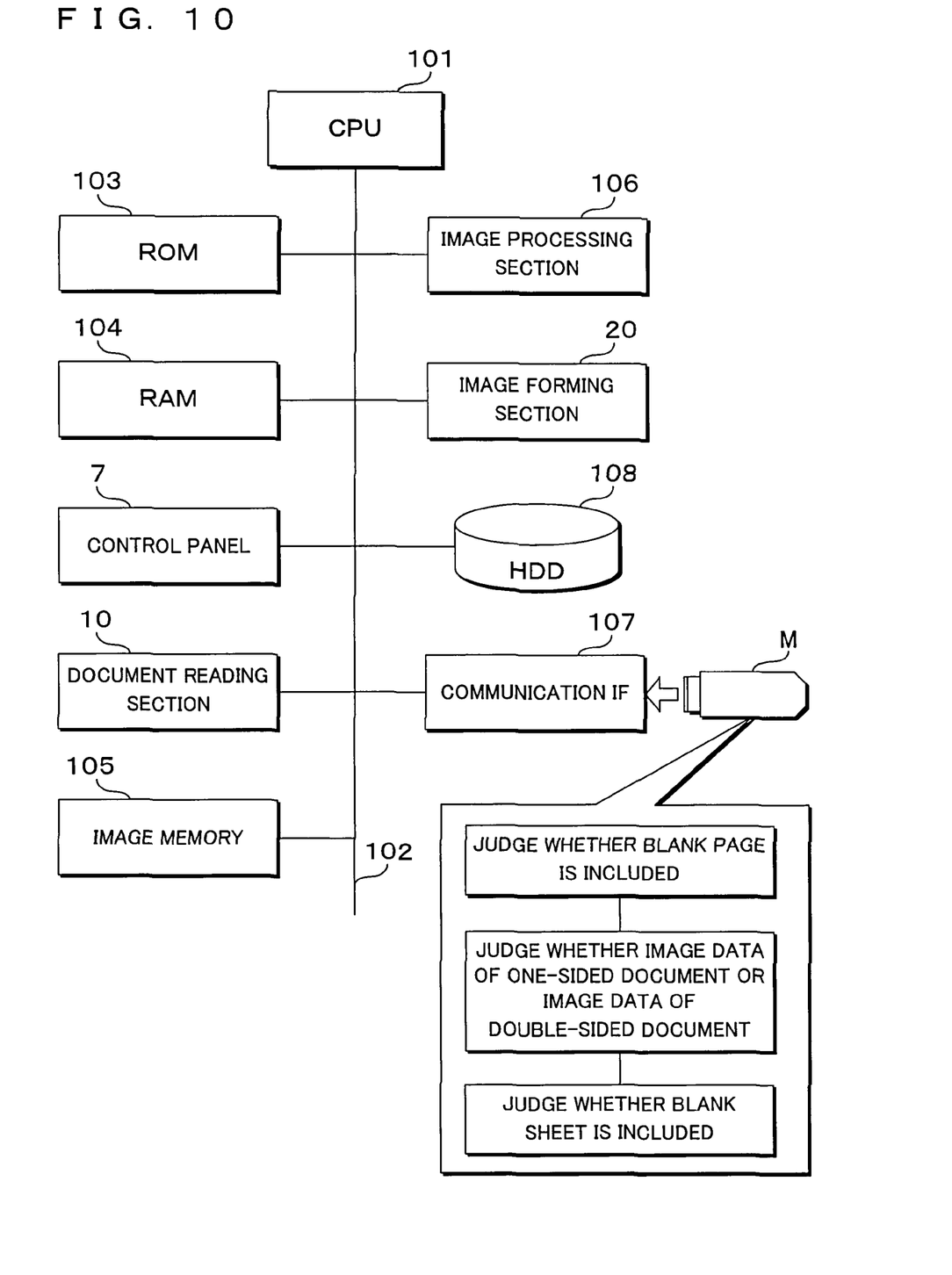
FIG. 10 is a block diagram showing a constitution of an essential part of a digital complex machine according to Embodiment 2.

FIG. 10 is a block diagram showing a constitution of an essential part of a digital complex machine according to Embodiment 2. A program for operating the digital complex machine according to Embodiment 2 can also be provided by a portable recording medium (hereafter a USB memory) M, such as a USB (Universal Serial Bus) memory via the communication IF 107 like present embodiment 1.

In the digital complex machine according to Embodiment 2, a program for judging whether a blank page is included, judge whether image data is image data of an one-sided document or image data of a double-sided document and judge whether a blank is sheet is included, or the like is memorized in the USB memory M, and the USB memory M in which said program is memorized is inserted via the communication IF 107. The program read from the USB memory M is stored in the HDD 108 by the instruction of the CPU 101. Such a program is loaded to the RAM 104 and is executed. Thus functions are provided as the digital complex machine described in Embodiment 1.

Embodiment 2 has constitution as described above, since other constitution and operations are the same as those of Embodiment 1, the same reference number is given to a corresponding portion, and the detailed explanation thereof is omitted.

As this description may be embodied in several forms without departing from the spirit of essential characteristics thereof, the present embodiment is therefore illustrative and not restrictive, since the scope is defined by the appended claims rather than by the description preceding them and all changes that fall within metes and bounds of the claims, or equivalence of such metes and bounds thereof are therefore intended to be embraced by the claims.

What is claimed is:

1. An image forming apparatus which performs image formation on a one side or both sides of a record sheet, based on image data of a one-sided document constituted of a sheet which has an object such as a character and a figure recorded on a one side thereof, or image data of a double-sided document constituted of a sheet which has objects recorded on both sides thereof, comprising, a controller capable of judging whether a blank page in which no object is recorded is included, based on said image data, wherein said controller is further capable of judging whether said image data is the image data of the one-sided document or the image data of the double-sided document in a case where image formation is to be performed on both sides of a record sheet, and wherein when said controller judges that the image data is the image data of the one-sided document, said controller judges whether a blank page is included, and when said controller judges that the blank page is included, said image formation is performed excluding said blank page.

2. The image forming apparatus according to claim 1, wherein said controller is further capable of judging whether the blank sheet whose both sides are blank pages is included based on said image data, in a case where image formation is to be performed on both sides of the record sheet and where said controller judges that said image data is the image data of the double-sided document, and wherein when said controller judges that the blank sheet is included, said image formation is performed excluding said both sides of the blank sheet.

3. An image forming apparatus which performs image formation on a one side or both sides of a record sheet, based on image data of a one-sided document constituted of a sheet which has an object such as a character and a figure recorded on a one side thereof, or image data of a double-sided document constituted of a sheet which has objects recorded on both sides thereof, comprising:

a blank page judging section for judging whether a blank page in which no object is recorded is included, based on said image data, and a document judging section for judging whether said image data is the image data of the one-sided document or the image data of the double-sided document in a case where image formation is to be performed on both sides of a record sheet, wherein when said document judging section judges that the image data is the image data of the one-sided document, said blank page judging section judges whether the blank page is included, and when said blank page judging section judges that the blank page is included, said image formation is performed excluding said blank page.

4. The image forming apparatus according to claim 3, further comprising a blank sheet judging section for judging whether a blank sheet whose both sides are blank pages is included based on said image data, in a case where image formation is to be performed on said both sides of the record sheet and where said document judging section judges that said image data is the image data of the double-sided document, wherein when said blank sheet judging section judges that the blank sheet is included, said image formation is performed excluding said both sides of the blank sheet.

5. An image forming method for performing image formation on a one side or both sides of a record sheet, based on image data of a one-sided document constituted of a sheet which has an object such as a character and a figure recorded on a one side thereof, or image data of a double-sided document constituted of a sheet which has objects recorded on both sides thereof, comprising:
- a blank page judging step of judging whether a blank page in which no object is recorded is included, based on said image data; and
- a document judging step of judging whether said image data is the image data of the one-sided document or the image data of the double-sided document in a case where image formation is to be performed on both sides of a record sheet; and
- a step of, when judgment is made as to whether the blank page is included at the blank page judging step when it is judged that the image data is the image data of the one-sided document at the document judging step and it is judged that the blank page is included, performing said image formation excluding said blank page.

6. The image forming method according to claim 5, further comprising:
- a blank sheet judging step of judging whether a blank sheet whose both sides are blank pages is included based on said image data, in a case where image formation is to be performed on both sides of a record sheet and it is judged that the image data is the image data of the double-sided document at said document judging step; and
- a step of, when it is judged that the blank sheet is included at said blank sheet judging step, performing said image formation excluding said both sides of the blank sheet.

7. An image forming method for performing image formation on a one side or both sides of a record sheet, based on image data of a one-sided document constituted of a sheet which has an object such as a character and a figure recorded on a one side thereof, or image data of a double-sided document constituted of a sheet which has objects recorded on both sides thereof, comprising:
- a judging step of judging whether image formation is to be performed on a one side of a record sheet or on both sides of a record sheet;
- a document judging step of judging whether said image data is image data of a one-sided document or image data of a double-sided document when it is judged that image formation is to be performed on both sides of a record sheet at said judging step;
- a blank page judging step of judging whether a blank page in which no object is recorded is included, based on said image data, when it is judged that image formation is to be performed on a one side of a record sheet at said judging step, or when it is judged that said image data is image data of an one-sided document at said document judging step;
- a blank sheet judging step of judging whether a blank sheet whose both sides are blank pages is included based on said image data, when it is judged that image formation is to be performed on both sides of a record sheet at said judging step and it is judged that said image data is image data of a double-sided document at said document judging step;
- a step of, when it is judged that a blank page is included at said blank page judging step, performing image formation excluding said blank page; and
- a step of, when it is judged that a blank sheet is included at said blank sheet judging step, performing image formation excluding said both sides of the blank sheet.

8. A computer-readable recording medium storing a computer program for causing a computer to perform image formation on a one side or both sides of a record sheet, based on image data of a one-sided document constituted of a sheet which has an object such as a character and a figure recorded on a one side thereof, or image data of a double-sided document constituted of a sheet which has objects recorded on both sides thereof, said computer program comprising:
- a blank page judging step of causing a computer to judge whether a blank page in which no object is recorded is included, based on said image data;
- a document judging step of causing a computer to judge whether said image data is the image data of the one-sided document or the image data of the double-sided document in a case where image formation is to be performed on both sides of a record sheet; and
- a step of, when judgment is made as to whether the blank page is included at the blank page judging step in the case where the image data is the image data of the one-sided document at the document judging step and it is judged that the blank page is included, causing a computer to perform said image formation excluding said blank page.

9. The recording medium according to claim 8, wherein said computer program further comprises:
- a blank sheet judging step of causing a computer to judge whether a blank sheet whose both sides are blank pages is included based on said image data, in a case where image formation is to be performed on both sides of a record sheet and it is judged that the image data is the image data of the double-sided document at said document judging step; and
- a step of, when it is judged that the blank sheet is included at said blank sheet judging step, causing a computer to perform said image formation excluding said both sides of the blank sheet.

10. A computer-readable recording medium storing a computer program for causing a computer to perform image formation on a one side or both sides of a record sheet, based on image data of a one-sided document constituted of a sheet which has an object such as a character and a figure recorded on a one side thereof, or image data of a double-sided document constituted of a sheet which has objects recorded on both sides thereof, said computer program comprising:
- a judging step of causing a computer to judge whether image formation is to be performed on a one side of a record sheet or on both sides of a record sheet;
- a document judging step of causing a computer to judge whether said image data is image data of a one-sided document or image data of a double-sided document when it is judged that image formation is to be performed on both sides of a record sheet at said judging step;
- a blank page judging step of, causing a computer to judge whether a blank page in which no object is recorded is included, based on said image data, when it is judged that image formation is to be performed on a one side of a record sheet at said judging step, or when it is judged that said image data is image data of a one-sided document at said document judging step;
- a blank sheet judging step of causing a computer to judge whether a blank sheet whose both sides are blank pages is included based on said image data, when it is judged that image formation is to be performed on both sides of a record sheet at said judging step and it is judged that said image data is image data of a double-sided document at said document judging step;

a step of, when it is judged that a blank page is included at said blank page judging step, causing a computer to perform image formation excluding said blank page; and a step of, when it is judged that a blank sheet is included at said blank sheet judging step, causing a computer to perform image formation excluding said both sides of the blank sheet.

* * * * *